Patented June 24, 1947

2,422,875

UNITED STATES PATENT OFFICE 2,422,875

PROCESS OF REFINING HYDROCARBONS

Per Henning Wilhelm Ågren, Nynashamn, Sweden, assignor to A. Johnson & Co., New York, N. Y., a company of Delaware No Drawing. Application June 24, 1944, Serial 542,004. In Sweden August 17, 1942

9 Claims. (Cl. 196—24)

1

The present invention relates to a new method of refining liquid and gaseous hydrocarbons, such as cracked or uncracked gasoline, kerosene and similar products from petroleum, shale oil, hydrocarbon gases containing organic sulfur compounds, etc. The invention is characterized by the fact that the hydrocarbons in the vapor and/or liquid phase with or without the addition of hydrogen or hydrogen containing gases is brought in contact with a catalyst entirely or at least partly consisting of aluminous cement, with a content of $Al_2O_3$ amounting to at least 25 per cent. According to the invention the cement may e. g. be employed in mixture with compounds of iron or manganese, suitably in the form of oxides or hydroxides, e. g. admixed in the form of bog-ore. It is also possible to employ metallic iron or manganese which is mixed into or produced by reduction of the catalytic compound.

The invention is particularly useful for desulfurizing sulfur containing hydrocarbon mixtures which, upon treatment with the aforementioned catalysts, will give off the sulfur in the form of hydrogen sulfide with a high yield of high quality refined products. The desulfurizing is of particular importance in the production of knock-stable motor fuels, the "sensitivity" of which to antiknock compounds, such as tetraethyl lead, iron carbonyl etc., is considerably increased by a lowering of the sulfur content.

If hydrogen is present during the catalytic treatment, a hydrogenation of di-olefines possibly present will take place, which is advantageous since it will improve the stability of the hydrocarbon mixture. Olefines present in the mixture will also be influenced by this reaction, although to a lesser degree, which makes it possible, by selecting a suitable pressure and temperature, to produce such conditions that only the very unstable di-olefines will mainly become hydrogenated, whereas the olefines will but to a small degree be acted upon; thus only making a slight lowering of the octane number of the hydrocarbon mixture necessary.

The catalyst is active at both atmospheric and high pressures up to 100 atmospheres and more, at temperatures ranging from about room temperature (20° C.) up to 500° C. and more.

I claim:

1. A process for the refining of hydrocarbons, comprising contacting said hydrocarbons with a catalyst at least partly consisting of aluminous cement, having a content of $Al_2O_3$ of at least 25 per cent.

2

2. A process according to claim 1 in which the hydrocarbons are contacted at least partly in the vapor phase with the catalyst.

3. A process according to claim 1 in which the hydrocarbons are contacted at least partly in the liquid phase with the catalyst.

4. A process according to claim 1 in which the hydrocarbons are contacted with a catalyst comprising aluminous cement in mixture with a catalytic agent selected from a class consisting of iron and manganese oxides and hydroxides.

5. A process according to claim 1 in which the hydrocarbons are contacted with the catalyst in mixture with a gas at least partly consisting of hydrogen.

6. A method of refining gasolines for removal of sulfur which comprises contacting a gasoline with a catalyst consisting of aluminous cement in admixture with a catalytic material selected from a class consisting of iron and manganese oxides and hydroxides, said aluminous cement having a content of $Al_2O_3$ of at least 25 per cent.

7. The process of claim 6 wherein said catalytic material is bog-ore.

8. A process according to claim 1 in which the hydrocarbons are contacted with a catalyst comprising aluminous cement in admixture with a catalytic agent selected from a class consisting of metallic iron and manganese and mixtures thereof.

9. The process of claim 6 wherein said catalytic material is selected from a class consisting of metallic iron and manganese and mixtures thereof.

PER HENNING WILHELM AGREN.

REFERENCES CITED

The following references are of record in the file of this patent:

UNITED STATES PATENTS

| Number | Name | Date |
|---|---|---|
| 2,315,144 | Watson | Mar. 30, 1943 |
| 2,356,095 | Schulze | Aug. 15, 1944 |
| 2,325,115 | Egloff | July 27, 1943 |
| 1,884,269 | Russell | Oct. 25, 1932 |
| 2,016,271 | Buell et al. | Oct. 8, 1935 |
| 2,340,922 | Bent et al. | Feb. 8, 1944 |

FOREIGN PATENTS

| Number | Country | Date |
|---|---|---|
| 438,354 | Great Britain | Nov. 12, 1935 |
| 236,230 | Great Britain | Sept. 27, 1926 |